Sept. 4, 1951             O. GROB             2,567,018

ELECTRICAL REMOTE CONTROL SYSTEM

Filed Dec. 29, 1945                        9 Sheets-Sheet 1

Inventor:
Oskar Grob
by Sommers & Young
Attorneys

FIG. 3a

Sept. 4, 1951 O. GROB 2,567,018
ELECTRICAL REMOTE CONTROL SYSTEM
Filed Dec. 29, 1945 9 Sheets-Sheet 3

FIG. 3b

Inventor:
Oskar Grob
by Sommers & Young
Attorneys

Sept. 4, 1951 O. GROB 2,567,018
ELECTRICAL REMOTE CONTROL SYSTEM
Filed Dec. 29, 1945 9 Sheets-Sheet 5

Inventor:
Oskar Grob
by Sommers & Young
Attorneys

FIG. 6

Sept. 4, 1951          O. GROB          2,567,018

ELECTRICAL REMOTE CONTROL SYSTEM

Filed Dec. 29, 1945          9 Sheets-Sheet 7

Sept. 4, 1951            O. GROB            2,567,018

ELECTRICAL REMOTE CONTROL SYSTEM

Filed Dec. 29, 1945            9 Sheets-Sheet 8

Inventor:
Oskar Grob
by Sommer & Young
Attorneys

Sept. 4, 1951          O. GROB          2,567,018
ELECTRICAL REMOTE CONTROL SYSTEM Filed Dec. 29, 1945          9 Sheets-Sheet 9

Patented Sept. 4, 1951

2,567,018

UNITED STATES PATENT OFFICE 2,567,018

ELECTRICAL REMOTE CONTROL SYSTEM

Oskar Grob, Uster, Switzerland, assignor to Zellweger A. G. Apparate- und Maschinenfabriken Uster, Uster, Switzerland Application December 29, 1945, Serial No. 638,064
In Switzerland December 30, 1944

10 Claims. (Cl. 177—353)

In electrical engineering there often arises the problem, e. g. in electric power distribution systems, of controlling circuit makers and breakers with the aid of existing small control outputs, which require more power for operation than is available beforehand. The application of the well-known thermionic-valve amplifiers permits of solving such problems. Since thermionic valves possess only a limited and comparatively short life, the use of thermionic-valve amplifiers is in many cases practically not possible.

My present invention relates to improvements in the remote control of electrical circuit makers and breakers, comprising the storing of the electrical control power in a storage device on the receiver side for a certain length of time, whereupon the stored energy is delivered or sluiced in a relatively shorter time but at a greater rate for the purpose of operating a series of circuit makers and breakers. In this way the control of circuit makers and breakers is made possible without the use of thermionic-valve amplifiers, by means of substantially less power than would otherwise be required. This method is based on the fact that controllers require for operation a certain power for only a very limited time (fraction of a second), while the control power in many cases is available or may be made available, for a much longer time. If, now, we succeed to store the energy of the control power $Ps$ over a certain comparatively long time $ts$ for the purpose of operating the controller afterward by means of the stored input $As=Ps \cdot ts$ in the comparatively short interval $tR$, the power $PR$ available for operation, then is theoretically greater than the initial control power $Ps$ by the ratio $$\frac{ts}{tR}$$

in practice, the storing process always will result in certain losses which may be taken into account by means of an efficiency coefficient $\eta$ (always less than unity). Where the immediate operation of a controller is not required, the storage process indicated replaces an amplifier having a power amplification coefficient of $$V = \frac{ts}{tR} \cdot \eta$$

My invention further relates to a device for carrying out the method indicated, comprising a storage device for storing the electrical energy of the control input, which is connected to a temporarily completed circuit for the purpose of delivering the stored energy.

When controlling a master drum instead of a simple relay, the method indicated permits, e. g., of positioning a multistage and multi-polar contactor at one or more receiver stations as desired, e. g. into a position 4, from a common companding station. When it is desired, at a later time, to switch the contactor ahead, e. g. into a position 7, this may be readily accomplished by ordinarily passing three impulses; but during the execution of the switching command, however, all receiver switches have to pass over the stations 5 and 6, which fact temporarily calls for corresponding switching operations. In many cases such temporary and inadvertent switching is of no importance, in other cases it is only a matter of inconvenience, and in still other cases it is definitely not permissible.

To avoid these difficulties, a further adaptation of the method indicated comprises the storing of a starting and, at certain intervals, of operating impulses on the receiver side for a switchgear which, after having received the starting impulse, moves past a series of switches to be operated, at a speed corresponding to the time intervals of the transmitted impulses. The said switches thereby are moved into the one or other of two possible switching positions, according to whether the switch mechanism upon passing by the respective switch receive an operating impulse or not. The positions of the individual switches thus may be changed without having to change the position of any other switch.

In accordance with this latter feature of the method, a further adaptation of the system according to my present invention comprises on the transmitter side a device for transmitting starting and operating impulses, and a switch gear associated on the receiver side with the storage device which coacts with a series of switches having two switching positions; at least one contactor, which is to be periodically made, being operated in the circuit to be temporarily completed for the purpose of delivering or sluicing the stored energy, and the coacting of the switch gear with the switches being timed in correspondence with the transmitted impulses.

A further improvement of the method last named comprises the use of a single electric motor for all switching operations on the receiver side, and the fact that only the control of these switching operations is effected by the stored energy of the transmitted impulses.

The system is adapted to the latter feature of the inventive method by so adapting and connecting the switching mechanism with an electric motor and with the circuit to be temporarily completed for the purpose of delivering the stored energy, that all switching is done by the electric motor, and that only the control of these switching operations is effected by the energy stored in the storage device.

The stored energy is released and delivered in the method indicated by completing a circuit by means of a contactor to be temporarily made. The said contactor is actuated either by an automatic relay or an electric motor. Practice has shown that the latter solution is more positive in operation, and requires less material in the case of a plurality of switches. It, however, possesses the disadvantage that the electric motor has to run continuously, if the system has to be constantly ready for reception.

A further improvement in this method comprises the delivery or sluicing of the energy, stored in the storage device on the receiver side for the purpose of actuating the electrical switch gear, at least on a first control impulse by way of a switch element which only responds when the stored energy has attained a certain value. By means of such switch element an electric motor for actuating a switch mechanism may be cut in automatically for the control of the delivery of the energy at a first control impulse so that the electric motor does not have to rotate continuously.

Such improvement of the method corresponds to a further adaptation of the system according to my present invention, in which a switching element is connected to the circuit which, for the purpose of delivering the stored energy, is temporarily completed, which element responds only when the stored energy has reached a certain value.

The switch element preferably is adapted as a glow discharge lamp, since the latter, upon reaching the ignition voltage, becomes a conductor, i. e. may complete a circuit, for such length of time, until the voltage across it becomes smaller than the extinguishing voltage.

Several embodiments of devices pertaining to the system for carrying out the inventive method are illustrated in the accompanying drawing, in which Fig. 11 is a schematical top view of the receiver, Fig. 12 a section through the mechanical portion of a further example, and the wiring diagram thereof, Figs. 13–15 are top views of important mechanical details of the latter example.

Figure 1:
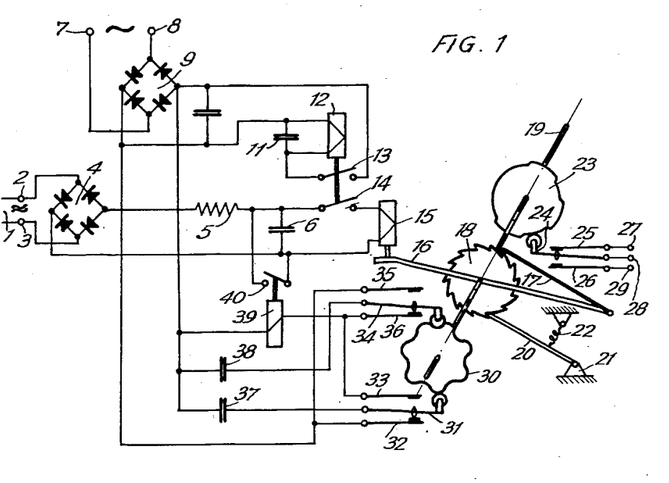
Fig. 1 is a wiring diagram according to a first example, Fig. 2 a wiring diagram of a modification thereof, Fig. 3 (a and b) a wiring diagram of another example, Fig. 4 a side view of a device according to Fig. 3, Fig. 5 a plan view thereof.

For the purpose of ratcheting forward the ratchet wheel 18 of the step-by-step switch gear shown in Fig. 1, a control voltage is laid over the control leads 1 onto the terminals 2 and 3 of the system for a certain time $t_s$. If this control voltage is an alternating one, as shown in Fig. 1, it is rectified in the rectifier 4, and transmitted onto the condenser 6. If the control voltage be a continuous current voltage, the rectifier 4 is omitted. The condenser 6 is charged by the (rectified) control voltage, since the contactor 14 of the auxiliary relay 12 is normally open and since the latter, fed by the lighting or power mains 7, 8, over the rectifier 9, closes the contactor 14 only periodically for a short time. Let the interval of such a period be $t_h$. The periodic closing of the relay 12 is effected by energising its coil, through the main-led rectifier 9 by way of the auxiliary contactor 13, only when the armature of the relay 12 has dropped off. At the same time the condenser 11 is being charged when the armature has dropped off. When the relay 12, now, picks up, its excitation from the rectifier 9 is interrupted by its contact 13. In addition, the condenser 11 is being discharged over its exciter coil, with the result that the armature of the relay 12 drops off only when the discharge current has decreased so that it is no longer sufficient to hold the armature. When the latter drops off, the cycle is repeated. When, now, the condenser 6 has been charged by a control voltage during the time of break of the contactor 14, the condenser 6 is discharged during the succeeding time of make of the contactor 14 over the exciter coil 15, of the step-by-step switch gear. The armature 16, pivoted on the shaft 19, picks up. The ratchet 17 pivoted on the armature 16 engages the ratchet wheel 18 and turns same forward for one pitch. A locking device, comprising a pawl 20, the bearing 21 thereof, and the spring 22, prevents a return of the ratchet wheel 18 when the armature 16 drops off again and when the ratchet 17 slides back at the same time.

A cam wheel 23, actuating a set of contactor leaf springs 24—26 according to a certain scheme embodied in the said wheel, is keyed to the shaft 19, as is also the said ratchet wheel 18. The circuits to be finally controlled may be connected to the terminals 27—29. It is possible, of course, to mount a greater number of cam discs on the shaft 19, and to associate a plurality of contactor-spring sets therewith so as to readily permit of executing the most complicated switching schemes.

In place of cam discs and spring sets, any other convenient type of rotary switches may be used.

The time interval $t_s$, during which the control voltage is applied to the terminals 2 and 3, naturally is not phase-related to the time during which the contact 14 is made once. It thus will happen in practice that the contact 14 will be made prior to the temporary completion of a control impulse. In order that the step-by-step switch gear may be positively stepped forward with each control impulse, the time $t_s$ must be selected at least of such length that the condenser 6 be sufficiently charged in half the time $t_s$. In accordance with the contact 14 being made substantially prior or subsequent to the elapse of half the time $t_s$, the step-by-step switch gear is operated prior or subsequent to the completion of the control impulse respectively. When, however, the contact 14 is made approximately after the elapse of half the time $t_s$, it may happen that a control impulse provokes two steps on the switch gear, since the charge of the condenser 6 is sufficient for actuating the armature 16 upon making the contact 14 after elapse of half the control time. The condenser 6, however, is charged anew approximately to the same degree so that, upon a subsequent making of the contact 14, it be probably again discharged by way of the exciting coil 15, thus inadvertently engaging the armature 16 a second time.

In order to avoid such faulty switching, the following auxiliary device, also shown in Fig. 1, is provided for:

A cam disc 30 is keyed to the shaft 19, and actuates two sets of throw-over spring contactors 31—33 and 34—36. The cam disc 30 is so adapted as to throw over the contactors 31 and 34 with each step of the ratchet wheel 18. In the position shown, the condenser 37 is charged by the main-fed auxiliary rectifier 9 over the spring contactors 31 and 32. When now the switch gear is moved forward one step under the influence of a control impulse, the condenser 37 is connected to the exciting winding of the relay 39 by way of the made contacts 31 and 33. The condenser 37 then is discharged over this exciting winding, the relay 39 picks up, and short-circuits the condenser 6 by means of its contactor 40. By so dimensioning the condenser 37 and the exciting winding of the relay 39 as to keep the latter energised by the condenser discharge current for a time corresponding to the control time $ts$ at least, the above-mentioned faulty switching is eliminated, as a second charging of the condenser 6 is prevented by the made contact 40. In this new position of the step switch gear, the condenser 38 is charged over the spring contactors 34 and 35, and discharged after the following step over the spring contactors 34 and 36 and the exciting winding of the relay 39, the contactor 40 of the latter again short-circuiting the condenser 6 during the desired time. The condensers 37 and 38 thus are alternatingly charged and discharged through the relay 39 at each step of the switch gear.

The use of this auxiliary device for preventing faulty switching necessitates of course, when voluntarily passing two or more control impulses, the observance of a waiting time between the individual impulses. This waiting time shall last at least until the relay 39, actuated by the preceding impulse, has dropped off again, and the short-circuiting of the condenser 6 thus is again suspended.

In many practical cases, in particular when very little control power is available, the condenser 6 suitably is not directly discharged through the exciting coil 15 of the switch gear, but a highly sensitive relay, actuated by means of the discharge current of the condenser 6, is provided for, which in its turn drives the step switch gear proper by means of its contactors and of a main-fed auxiliary rectifier.

Figure 2:
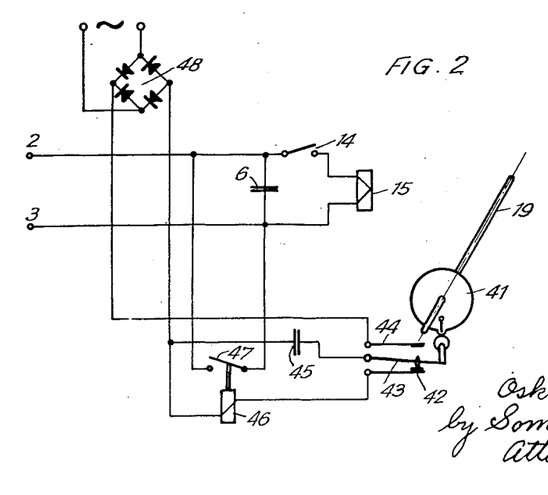

In Fig. 2 another auxiliary device of the system is illustrated, which permits of turning a greater number of step switch gears from a central commanding station into a certain zero position by means of a series of control impulses, even when the initial positions of the various step switch gears are unknown and different from each other. Such a possibility is of quite some interest, since it permits the central station to bring all step switch gears controlled by same from time to time positively into a zero position, thus correcting any faulty switching which might have occurred.

A further cam wheel 41 is secured to the shaft 19, which has only one cam in a zero position of the step switch gear indicated by a zero and a line. When the switch gear is not in this zero position, the condenser 45 is charged by the main-fed auxiliary rectifier 48 over the spring contactors 43 and 44. As soon as, however, the step switch gear has performed its last step for attaining its zero position, the charged condenser 45 is thrown over so that it is discharged through the exciting winding of the relay 46. The latter picks up, and short-circuits the condenser 6 with its contactor 47 for such a length of time, that the gradually diminishing discharging current of the condenser 45 cannot hold the relay 46 any longer. As long as the condenser 6 is short-circuited, the step switch gear—as said before—cannot step ahead, even under the influence of control signals. When the step switch gear contains $n$ positions, inclusive of its zero position, and the condenser 45 is so dimensioned that it can hold the relay by means of its discharge current at least for such time until $n-1$ control impulses have been passed in order from a central control station, all of the associated step switch gears may be brought into the zero position from the said station by passing $n$ immediately succeeding control impulses. The initial positions of the step switch gear are of no importance in this connection, and do not have to be known at the control station, as each step switch gear is insensitive after reaching the zero position, at least for the time of the still following impulses, by virtue of the short-circuiting of its condenser 6.

The use of this auxiliary device, however, necessitates the observance of a waiting period between each passage of a control signal which has brought the step switch gears into the zero position and the passage of a further signal which again shall actuate the said gears, and at least for such a time until the relay 46 has dropped off again and thus has suspended the short-circuit of the condenser 6.

In the practical execution of the system described, a common relay, a common contactor, and a common auxiliary rectifier may readily be substituted for the relays 39 and 46, the contactors 40 and 47, and for the auxiliary rectifiers 9 and 48, since the various operating times are not obtained by the relay but by the storing capacity of the condensers. When the single relay is to be energized for one time pulse the discharge of the condenser 38 is initiated through contacts 36, 34 (or the discharge of condenser 37 through contacts 31, 33). When the same relay is to be energized for a time equivalent to $n-1$ pulses, the discharge of condenser 45 having a much greater capacity is initiated through contacts 42, 43.

The system described may be used in a plurality of applications for the distributing networks of electric power stations, the remote control of interrupters and of meter tariff changeover-switches, for the remote-controlled cutting in of street lamps, stairway lamps and the like.

By applying electrical frequency switches on the emitting and receiving sides, the control voltages may be transmitted over the distributing network itself in the form of sound—or high-frequency alternating voltages, thus eliminating the need of separate control lines.

In the system described, the electrical control output is stored in the condenser as electrostatic energy. It also, however, could be stored in an electrical accumulator or battery in the form of electrochemical energy.

The contact 14 also could be periodically made by an electric motor instead of the relay 12.

In the auxiliary devices described for preventing two switchings initiated by one control impulse and for positively returning the step switch gears into their zero position, an undesired further switching always is prevented by short-circuiting the storage condenser 6.

Such prevention also may be attained, of course, by any short-circuit or interruption, or by simply changing any switch element or circuit of the device necessary for further switching.

Figure 3A:
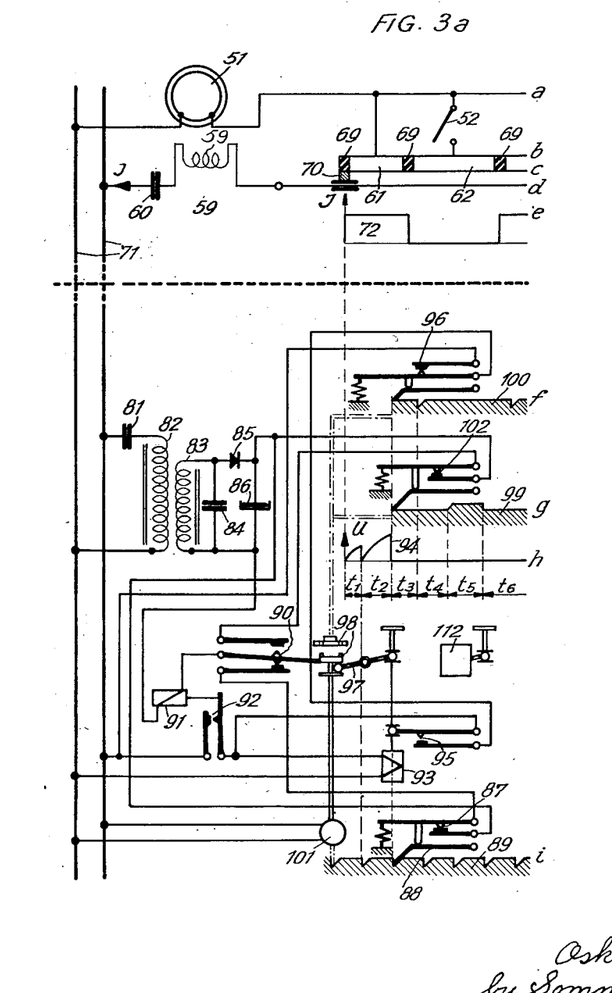
Figure 3B:
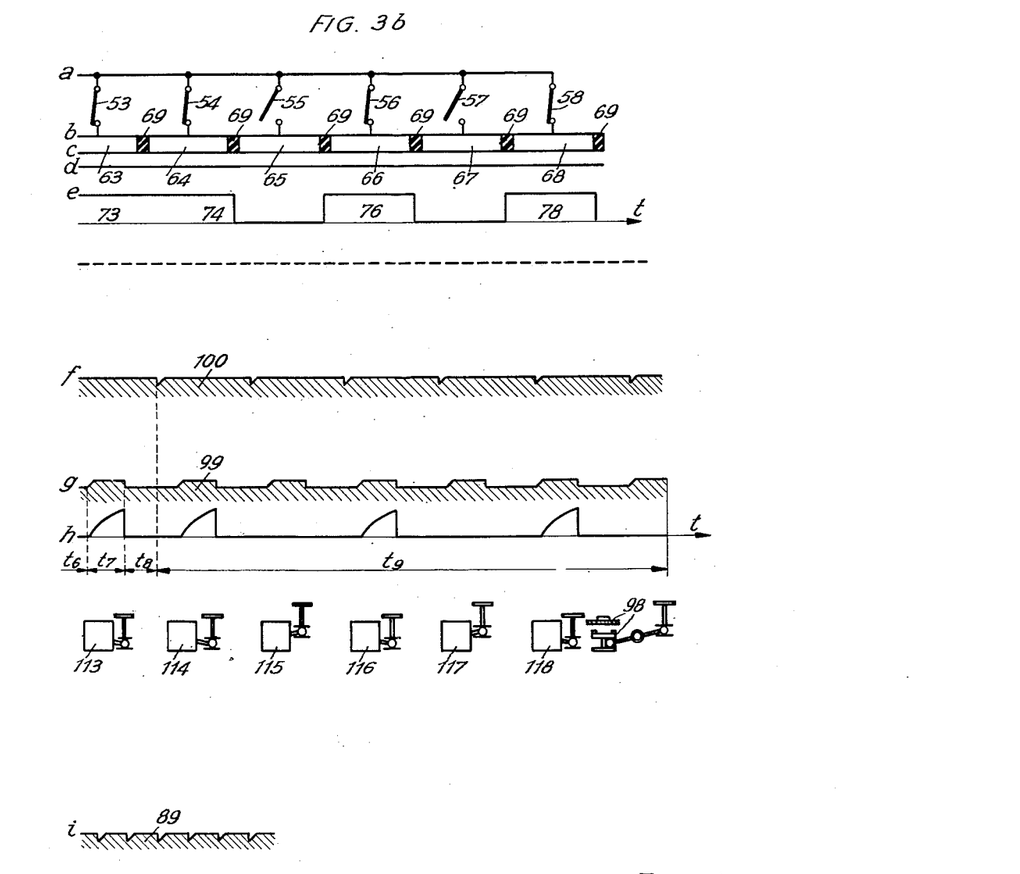

In Fig. 3 (a and b) the generator 51 produces an alternating control voltage of a certain frequency in the emitter. The seven control switches 52—58 may be switched on and off at the switchboard station as desired, whereby seven corresponding switches on the receiver side have to be actuated after the regular transmission of operating impulses. The contactor laminations 61—68 are separated from each other by the insulations 69. A contactor brush 70 is traversed over the contactor track, comprising the laminations 61—68, and the insulations 69, at a certain constant speed after passing a releasing command.

The said contactor brush 70, on the other side, is connected to a two-pole line 71 through a choke 59 and a condenser 60. This line 71 may be identical, e. g., with the line for transmitting 50-cycle light or power current. When in Fig. 3, e. g., contacts 52, 55 and 57 are broken, and contacts 53, 54, 56 and 58 made in the commanding station, the control current J, shown in the diagram in function of the time t, flows into the line 71 during the run of the contactor brush 70. The first impulse 72 shall be called the starting impulse, and the impulses 73, 74, 76 and 78 operating impulses. They correspond to the closed switches 53, 54, 56 and 58.

The starting impulse, e. g., may last 10 seconds, and the operating impulses 17 seconds.

In a practical design, the contactor laminations 61—68 preferably are disposed in a closed circle, the brush 70 being mounted on an arm pivoted in the centre of this circle. The contactor arm for the purpose of passing the contactor track conveniently is driven by a mainfed synchronous motor by way of a gear train.

Starting and operating impulses, now, are transmitted over the line 71 to the receiver or receivers. In Fig. 3 a receiver is schematically shown below the horizontal dotted line. As in the emitter, cam and contactor-tracks, which in practice are circularly adapted, are shown rectilinear in the receiver also. This manner of illustration possesses the advantage that the timely tuned run of all functions can be more readily recognised. In the receiver, the impulses are filtered in a band pass filter, tuned to the control frequency and comprising the condensers 81 and 84 and the chokes 82 and 83, and rectified in a rectifier 85; upon which they charge a storage condenser 86.

A contact 87 is periodically made for a short time by a leaf spring 88 which continuously slides at uniform speed over a cam bar 89. This make takes place, e. g., every five seconds and for approximately $\frac{1}{10}$ second. The cam bar 89 (actually a cam disc) is being continuously driven by a synchronous motor 101 comprising a built-in gearing. While the contact 87 is made, the storage condenser 86, as shown, is connected with the exciting winding of a responding relay 91 through the throw-over switch 90. When now, a starting impulse is transmitted from the emitter, the storage condenser 86 is charged between two makes of the contact 87. Due to the discharge current of the storage condenser 86, the relay 91 picks up on the second make of the contact 87, and contact 92 is made to complete the exciting circuit of an electromagnet 93. Since, as said before, the starting impulse 72 lasts for 10 seconds, and contact 87 is periodically made every five seconds, there always is at least one making of contact 87 prior to which the condenser 86 has been charged for five full seconds, irrespective of the phase condition between the starting impulse 72 and the making of contact 87. In the diagram 94 (Figs. 3a and 3b), the voltage U on the storage condenser 86 is shown as a function of the time $t$. U is a measure for the charging condition of the condenser 86. The diagram shows, e. g., how the storage condenser 86 has been first charged during the time $t_1$ (about 2½ seconds) by the starting impulse 72. The charge thus obtained was not sufficient yet to have the relay 91 respond when making contact 87. During the following interval $t_2$, the condenser 86 then was charged for five full seconds so that the charge was sufficient to operate the relay 91 by means of the discharge current upon making contact 87.

The electromagnet 93, which is fed e. g. directly with the 50-cycle voltage of the system available in the line 71, also picks up as soon as the relay 91 has worked, and releases with the following operations:

First, its working contact 95 is made, so that contact 92 of relay 91 is bridged, according to the wiring diagram, as long as contact 96 is also made. The electromagnet 93 thus is holding itself, and does not drop off in spite of contact 92 being broken again as soon as the discharge current of the storage condenser drops to a certain minimum.

Second, a coupling 98 is thrown in by the lever 97, and the cam bars (cam discs) 99 and 100 thus start moving to the left at uniform speed. They are driven by the synchronous motor 101 over the now engaged coupling 98. The drive itself is indicated in Fig. 3a by dash-and-dot lines. Further, the coupling 98, as well as the series of switches 112—118 to be actuated, is moving past the electromagnet 93. The coupling 98 remains engaged for the time being by means of a latch device (not shown).

Third, the spring contactor 90 is thrown upward, thus disconnecting the contactor 87 from the relay 91, and cutting in the contactor 102 into the circuit of the storage condenser 86.

After the time $t_3$ has elapsed, contact 96 is broken, and the electromagnet 93 drops off. After the time $t_4$ has elapsed, contact 102 is broken for a time $t_5$. Should an operating impulse arrive from the emitter during this time, the storage condenser 86 would be charged. In the example shown this, however, is not the case, since the switch 52 of the central station is "out." When, at the end of the time interval $t_5$, contact 102 is again made, the relay 91 and the electro-magnet 93 therefore are not working. The switch 112 passes by the magnet 93 during the time $t_6$. It is provided with a trip mechanism (not shown in Fig. 3), by which it is brought into the position "out" when passing by the magnet 93 at a time when the latter is not picking up. Should the switch 112 have occupied the "out"-position beforehand, it will, of course, remain therein. After the time $t_6$ has elapsed, contact 102 is again broken, and, since in the following time interval $t_7$ the operating impulse 73 arrives in the receiver from the emitter, the storage condenser 86 is charging itself this time. When now, after completion of the time interval $t_7$, contact 102, is made again, the condenser discharge current makes the relay 91 respond. The electromagnet 93 thus is set to work, on account of contact 92 having been made, and holds itself through the contacts 95 and 96 until the time interval $t_8$ has elapsed. During the interval $t_8$ the switch 113 passes by the magnet 93, and is brought into the "in"-position, since this time the relay has picked up, and remains in this position by the aid of an automatic latching device. If, by chance, the switch 113 has been in this "in"-position before, it is, of course, being held therein.

In the further operation, the cycles described with reference to switch 112 are repeated for the switches 115 and 117, while the functions described with reference to the switch 113 are repeated for the switches 114, 116 and 118. After the time $t_9$ has elapsed, the coupling 98 again passes by the magnet 93 (since the entire series of switches actually is disposed on a circle). The magnet 93, which at this moment has not picked up, disengages the coupling 98 by means of a device not shown, so that the cam bars (cam discs) 99 and 100, as well as the series of switches 112—118 again stand still. During the entire operation all of the receiver switches 112—118 have been brought, as desired, into the positions commanded by the emitter switches 52—58.

Figure 4:
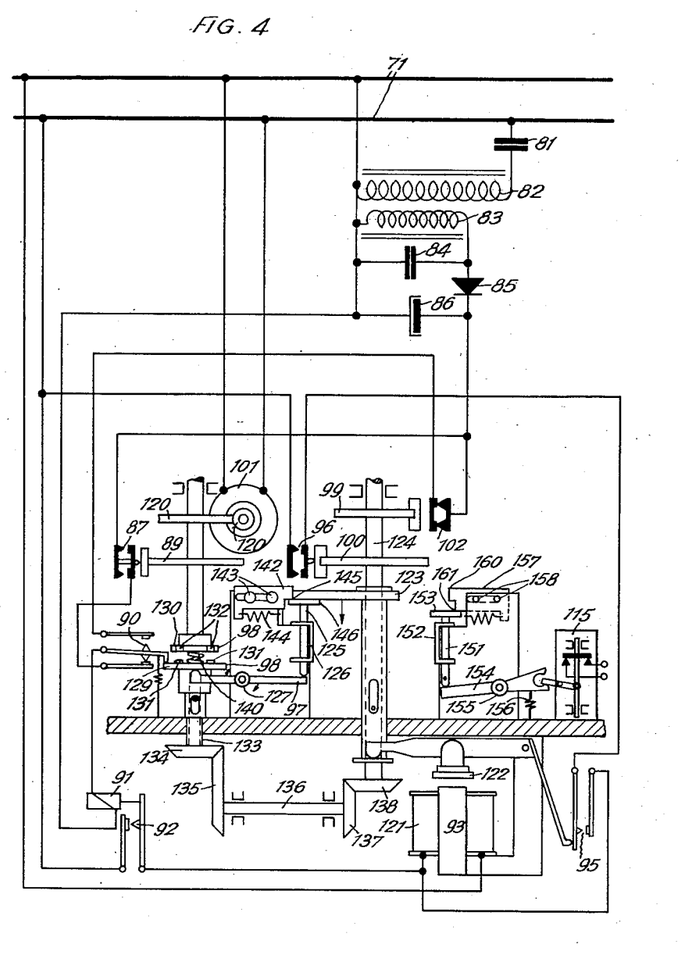

Fig. 4 illustrates, in a side view, a proposed constructive embodiment of the system incorporating an electromagnet 93 which moves a series of switches into the position "in" or "out" in accordance with operating impulses arriving from the emitter in the corresponding time or not respectively. For the sake of clearness, the same apparatus is shown in plan in Fig. 5.

The main-fed synchronous motor 101 drives the cam disc 89 counter-clockwise, e. g. with a speed of one R. P. M. by way of a worm gear drive 120. Contact 87 thus is made every five seconds for a short time. If the storage condenser 86 has been charged by an impulse of sufficient duration prior to such making, the condenser discharge current makes the relay 91 respond, and contact 92 is made. The exciting coil 121 of the magnet 93 thus is energized by main-line current, and the armature 122 picks up. A wiper 123, displaceably mounted on a shaft 124 thereby is moved down-ward in the direction of the arrow shown, and depresses a pin 125 displaceably mounted in a guide bracket 126. The two-arm lever 97, fulcrumed at 127, is rocked clock-wise, thus engaging the bottom half 129 of the coupling 98 with the top half 130. The followers 131 now are engaged in the bores 132; and the coupling 98 is closed. The shaft 124 thus starts to turn, driven by the worm gear 120, over the coupling 98, shafts 133 and 136, and bevel wheels 134, 135 and 137, 138. These gears are so calculated that the shaft 124 in the time $(t_3+t_4+t_5+t_6+t_7+t_8+t_9)$ performs a complete revolution (see Fig. 3). During such a revolution, the wiper 123 naturally moves away from the pin 125, in a plane at right angles to that of Fig. 4, i. e. in the direction of the arrow in Fig. 5. A latch 142, mounted displaceable on two pins 143 by means of a slot, has been moved, however, under the influence of a tension spring 144 to engage with its bottom edge 145 a head plate 146 of the pin 125. The latter thus is locked in its lower position, i. e., the coupling 98, engaged by a starting impulse sent from the emitter, remains engaged even when the wiper 123 has been turned off the pin 125. Shaft 124 and wiper 123 thus turn onward counter-clockwise, the said arm successively passing by the switches 112—118. As mentioned before, the latter are brought into the operative or inoperative position in accordance with an operating impulse being received during the passage of the wiper 123 by the respective switch, from the emitter. These operations will be more fully described yet with reference to the switch 115.

In Fig. 4 the switch 115 is shown in engagement. A pin 151, displaceably mounted in the guide bracket 152, is shown in its lower position so that a two-arm lever 154, fulcrumed on pivot 155, tends to hold switch 115 in engagement. A latch 157, mounted displaceable on two studs 158, prevents an upward movement of the pin 151 by having its bottom edge 161 bear upon the head plate 153 thereof. When the wiper 123, now, passes by the latch 157, the latter remains in the position shown, provided that during this time the electromagnet 93 has picked up in the wake of an operating impulse transmitted from the emitter. The tip of the wiper 123 in this case passes underneath a lug 160 so as not to engage the latch 157 at all; and the switch 115 thus remains in the engaged position. If the switch 115 had been in the disengaged position before, the wiper 123, after having received the operating impulse, would have depressed it through lever 154 into the engaged position by depressing the pin 151 with the head plate 153.

When the switch 115 is in the "in"- or engaged position, and when (as is assumed in the drawing) no operating impulse is arriving, the tip of the wiper 123 pushes the lug 160 of the latch 157 so far to the right as to release the head plate 153 from its engagement with the edge 161. Under the influence of the force exerted by the tension spring 156 onto the lever 154, the switch 115 is brought into its "out"- or disengaged position, and the pin 151 is raised so far as to have the head plate abut against the lug 160. The latch 157 is locked in its right-hand terminal position by the head plate 153.

When the switch 115 has been in the "out"-position beforehand, the wiper 123 could have readily passed by the lug 160 of the latch 157, the latter in this case being positioned further to the right and the switch would have remained in its "out"-position as desired.

The switches 112—114 and 116—118 (Fig. 3b) operate of course, in the same way and manner as the switch 115 which has been described in detail. When the wiper 123 finally regains its initial position, it will push the latch 142 to the left with its tip (since no control impulse is received from the emitter at this time) so as to trip the latching device of the pin 125. The coupling 98 is disengaged under the influence of the compression spring 140. The pin 125 then is being raised into its upper position through the lever 97. At the same time the discharge current circuit of the storage condenser 86 is again completed through the throw-over contactor 90 and the contactor 87. The device thus is ready to receive a new series of impulses. Each of the switches 112—118 to be operated, of course, may be of the multi-pole type, and, if required, may be adapted as a throw-over switch.

Further, it is not necessary that the position of switch, which corresponds to an impulse from the emitter, be the "in"- or engaged position, it may, however, be selected as "out"- or disengaged position; and such disposition may be of advantage under certain conditions. In case of a disturbance, it may happen that only the starting impulse and perhaps the first operating impulses reach the receiver, while the other operating impulses, however, are lost. Since the wiper 123 of each receiver controlled by a starting impulse passes by all of its switches, all of the latter in such a case of disturbance are so positioned as to correspond to the case "no impulse." If, now, it be less detrimental, in any given practical case, when a switch erroneously is brought into its "in"-position than into its "out"-position, the "in"-position suitably is associated with the "no impulse"-case.

A substantial structural simplification of the device described may be attained by replacing the finder-contactors 87 and 102 by a single contactor. In such a case, the contactor 87, which is controlled by the cam disc 89, is thrown over, after the receiver has been started, mechanically instead of electrically, as described, by means of the throw-over contactor 90. In such mechanical operation the cam disc 89 is pushed away from the contactor, and is replaced by the cam disc 99. The displacing movement necessary for such operation may be controlled by the electromagnet 93 which, as said before, also at the same time has to actuate the coupling 98 by means of a displacing movement.

Figure 6:
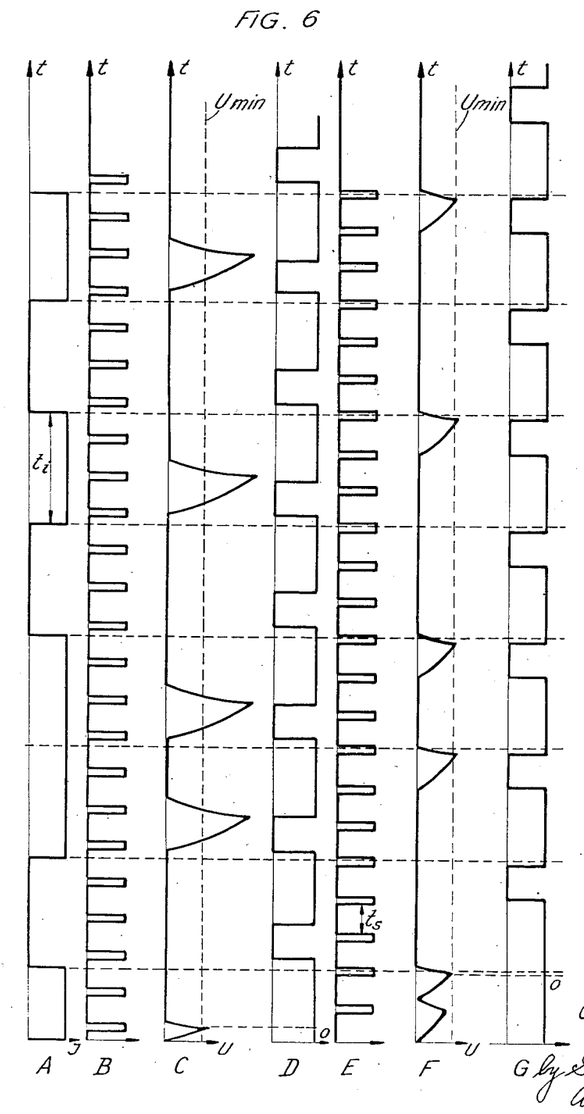
Fig. 6 represents several diagrams for explaining the device.

By aid of Fig. 6 it will be explained why the impulse for a switch to be actuated will last at least three times as long as the time of charging the storage condenser. In Fig. 6 are shown, by means of time diagrams:

(A) The run of the transmitter impulses;

(B) The search-contact time of contactor 87 which is formed by a spring set, in one extreme phase position relative to the transmitter starting impulse (controlled by cam wheel 89);

(C) The charging voltages U of the storage condenser 86 for the extreme case when the receiver relay 91 picks up even within a very short time after the starting signal 72 has started to pick up. Such extreme case is imaginable when very strong control impulses arrive at a receiver, which may charge the storage condenser 86 sufficiently in a minimum of time, and when at the same time the contact 87 by chance is made even within a very short time after begin of the starting impulse, as shown in B;

(D) The contact times of contactor 102 controlled by the cam disc 99 for the extreme case referred to in C;

(E) The search-contact time of contactor 87 in the other extreme phase-position relative to the transmitter starting impulse;

(F) The charging voltage U of the storage condenser 86 for the extreme case when the relay 91 in a receiver closes immediately before the end of the starting impulse 72. Such extreme case is imaginable when only very weak controlling impulses arrive in a receiver, which require, e. g., five full seconds for sufficiently charging the storage condenser 86, and when at the same time contact 87, as shown in E, is made in somewhat less than five seconds after the begin of the control impulse 72 so as to make the relay 91 only respond after completion of the second charge lasting five full seconds; and (G) The contact times of contactor 102 (controlled by the cam disc 99 for the extreme case referred to sub F).

In the diagrams (C) and (F) $U_{min}$ is that charging voltage on the storage condenser 86, which is at least required for picking up the relay 91 when it is discharged. The working of the coupling 98, which takes place immediately after the first pickup of relay 91, and which in its turn releases the start of the wiper 123 and of the cam discs 99 and 100, is indicated in the diagrams by a dotted line O. The diagrams clearly show that this start may be displaced, relative to the begin of the transmitter impulses, for an amount equal to plus or minus the storage time $t_s$. In order to have the breaking times of contactor 102 and thus the storage times lie within the associated operating impulses arriving from the transmitter yet, in the extreme cases also, the duration $t_1$ of the said impulses has to be made approximately three times as long as the storage time $t_s$.

Figures 7, 8, 9:
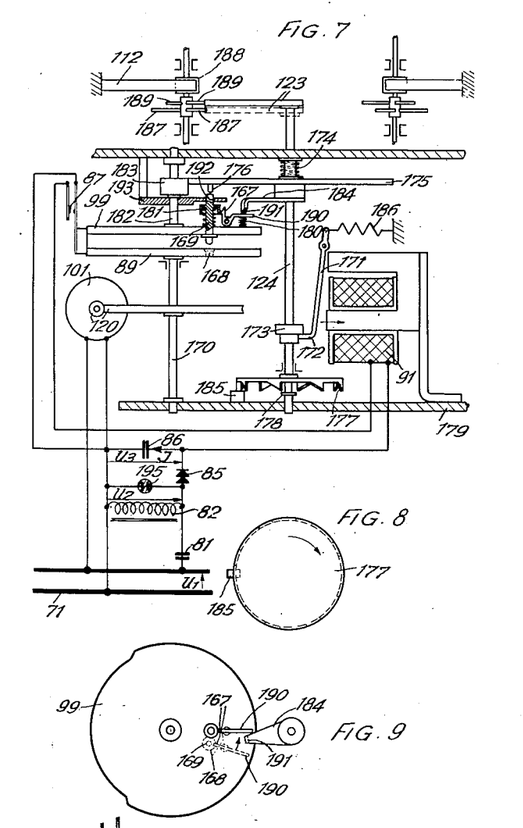
Fig. 7 shows a further embodiment in section through the mechanical part of a receiver, and the wiring diagram thereof.
Figs. 8–10 are top views of important mechanical parts of the receiver.

In Fig. 7 is 71 a two-pole high-tension line, over which, aside from the 50-cycle normal net voltage, also the control impulses of sound-frequency are transmitted to the individual subscribers from an electrical central station. The condenser 81, together with the coil 82, forms a series resonance circuit tuned onto the frequency of the control voltage. When the control voltage $U_1$ is present in the line 71, the following control voltage appears on the ends of the coil 82.

$$U_2 = q \cdot U_1$$

wherein $q$ is the coefficient of merit of the entire resonance circuit considering the additional dampings arising in the overall switching operation. This additional damping above all is great at the start of a control impulse, since a great charging current J flows into the storage condenser 86 through the rectifier 85.

With increasing voltage $U_3$ on the terminals of the storage condenser 86 the charging current I and thus also the damping on the resonance circuit decreases. After a certain time $t$, during which the control voltage $U_1$ is applied to the line 71, the voltage $U_3$ on the storage condenser 86 attains a certain value $U_{3\ max}$. The small line-fed and continuously running synchronous motor 101 drives a cam disc 89 at a speed of, e. g., four R. P. M. by way of a worm gear 120 and a shaft 170. The shape of the cam disc 89 is shown by the dotted line in Fig. 10, and comprises three peripheral cams spaced at equal distances. The contact 87 controlled by these cams thus is made, e. g., every five seconds. When, prior to its making, the storage condenser 86 has been charged by a starting impulse, it discharges upon such making through the exciting winding of the electro-magnet 91. If the condenser 86 had been charged sufficiently high, the pivotal armature 171 of the electromagnet 91 is rocked, in the direction of the arrow under the influence of the magnetic field produced by the discharge current. The lug 172 of the armature 171 thus is withdrawn from the set collar 173 on the shaft 124. The latter now, together with the wiper 123, the pinion 175, the collar 173, the crown wheel 177 and the collar 178, is depressed under the action of the spring 174 until the collar 178 abuts against the base plate 179. The armature 171 for the time being cannot return into its position of rest, in spite of the discharge current being cut off, since its lug 172 now is abutting against the periphery of the collar 173. By depressing the pinion 175, the stud 176 secured thereto has depressed the coupling pin 169 so far that its foot end enters the bore 168 on the face of the cam disc 89. The cam disc 99 and its shaft 182 thus also start to turn. The pinion 183 in its turn now drives also the pinion 175 with all parts mounted on its shaft 124. The stud 176 thus also is moved away from the coupling pin 169. The pawl 167, having engaged the face of the collar secured to the coupling pin 169 under the influence of the spring 180 before, prevents, however, a rise of the pin 169 for the time being. The trip 184 at the moment of the coupling process is situated a slight distance counter-clockwise (relative to the arm 184) in front of the pawl 167 (see Fig. 9) so as not to hinder the operation of the latter.

Figure 10:
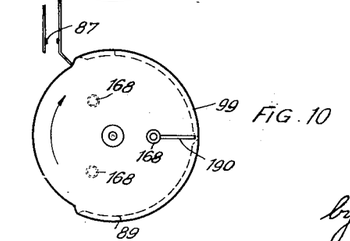

The contactor 87 now no longer is controlled by the cam disc 89, but by the cam disc 99. The shape of the latter is shown in Fig. 10 by the solid line. Since the coupling process always is taking place immediately after a making of contact 87 through the intermediary of one of the three cams of the cam disc 89, the relative position of the two cam discs when coupled is always as shown in Fig. 10. That means that after coupling the contact 87 remains made by the cam disc 99 for two thirds of a revolution (e. g. 10 seconds). A renewed charging of the storage condenser 86 during the remainder of the starting impulse thus is prevented, and thus also the deceitful prima facie evidence of a first operating impulse. After these two-thirds of a revolution, contact 87 is broken, and the storage condenser 86 now is ready for receiving the first operating impulse. When such latter arrives, the storage condenser 86 is charged during the following third of the revolution (e. g. five seconds) of the cam disc 99.

In the meantime the shaft 124 with the wiper 123 has turned (shown in Figs. 7 and 11 by dotted lines) to face the first switch 112 of the switches 112—118 to be operated. The crown wheel 177, by running one of its teeth up on the stationary cam 185, has raised the shaft 124 and all parts mounted thereon so far as to have the lug 172 of the armature 171 again project under the collar 173, under the influence of the tension spring 186. The shaft 124 thus remains latched on top by the lug 172, for the time being, in spite of the fact that, on turning the crown wheel 177 further on a tooth gap now is located above the cam 185.

Assuming the storage condenser 86 having been charged by an operating impulse during the said one third of a revolution of the cam disc 99, it discharges upon making contact 87 through the exciting winding of the electromagnet 91. The armature 171, 172 pulls up and trips the shaft 124 so as to depress same under the influence of spring 174 until collar 178 abuts against plate 179. Since lug 172 now again abuts against the periphery of collar 173, the shaft 124 for the time being remains depressed. The wiper 123 thus passes in its lower position, shown in Fig. 7 by dotted lines, by the switch 112, turning one of the spokes 187, and thus also the switch cam 188, in the direction of the arrow (Fig. 11) until the spring contactor 112 is engaged in the following notch of the cam 188, thereby closing switch 112. If the latter had been closed before, the wiper 123 could have passed by the spoke 187, which latter in such a case would be in a position turned forward in the direction of the arrow through 60°, without turning the switch cam 188, i. e. the switch 112 remains closed as desired.

Assuming, on the other hand, switch 112 had to be opened on command, no operating impulse is given during the corresponding time. The storage condenser 86 thus is not charged. When making contact 87, no discharge current is flowing through the electromagnet 91. The armature 171 does not pull up, and the shaft 124, and thus also the wiper arm 123, are held in the upper position by the lug 172. When contactor 112 is broken already (Fig. 11), the wiper arm 123 passes in front of the spokes 189, without turning the switch cam 188; and switch 112 remains open, as desired. If however, switch 112 had occupied the closed position, the wiper 123 would have turned one of the spokes 189 until the spring 112' had run up on a part of maximum diameter of the switch cam 188; and contact 112 had been broken too, as desired.

Figures 5, 11:
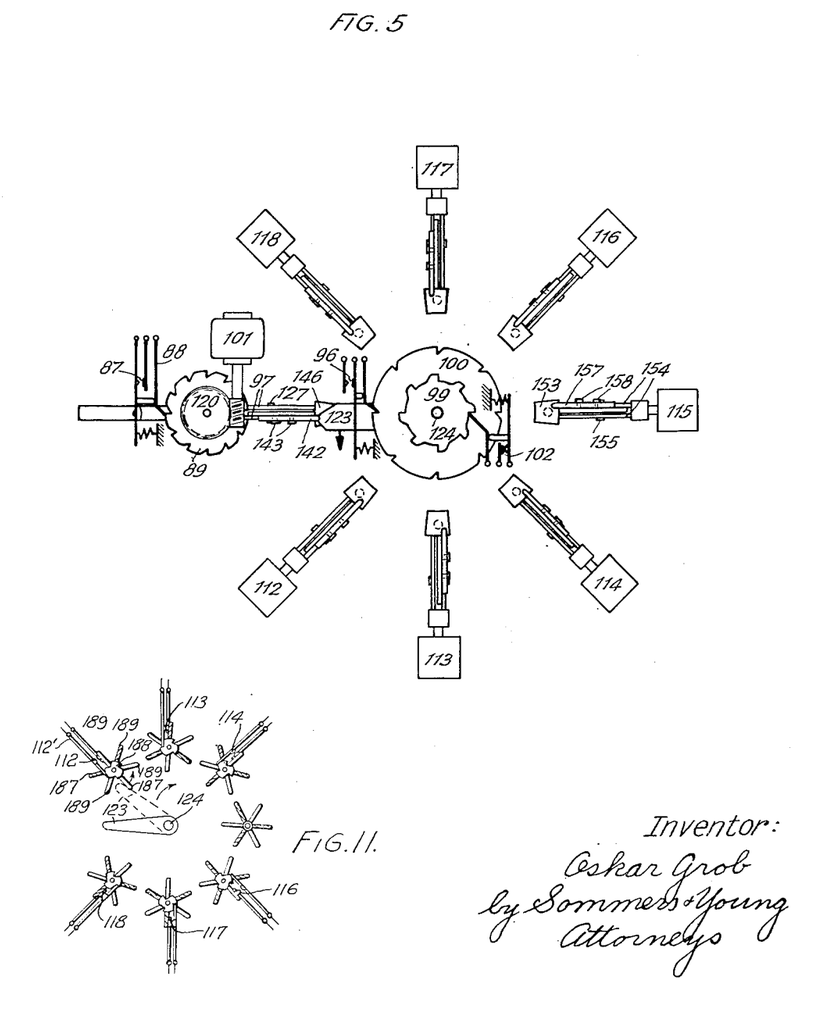

When the wiper 123 has passed the contactor 112, the succeeding tooth of the crown wheel 177 moves within the range of the stationary cam 185 so as to raise the shaft 124 again to its upper position, provided it be not therein already.

Contact 87 again remains made, after being made, for the purpose of releasing the first operating impulse for the contactor 112, during two-thirds of a revolution of the cam disc 99, and thus prevents a renewed charging of the storage condenser 86 by the eventual remainder of the first operating impulse. Such an undesired charging could erroneously make believe the existence of a second operating impulse, and thus lead to faulty switchings.

During the following one-third turn of the cam disc 99, contact 87 is broken. The condenser 86 may now be charged by an eventual second operating impulse for the purpose of cutting in contactor 113. The wiper 123, in the meantime, also has been turned up to the contactor 113. The latter then is actuated in the same way and manner as described with reference to contactor 112. The same holds true for the remainder of the contactors 114—118.

When the wiper 123 has passed by all of the contactors 112—118, and has reached its zero position again (shown by solid lines in Fig. 11), the coupling between the cam discs 89 and 99 is disengaged by means of the trip arm 184 secured to the shaft 124. This operation is as follows:

The trip arm 184, for the purpose of being tripped, is in the position shown in Fig. 9. The coupling 167—169, shown by dotted lines, is moving in the direction of the arrow toward the trip arm 184 shortly before being tripped. The rearward extension 190 of the pawl 167 then is passing underneath the bent-off and beveled lug 191 of the trip arm 184. When the entire coupling is turned further, the said extension 190 is depressed by the said lug 191 of the trip arm 184, so that pawl 167 trips the coupling pin 169. The latter is raised by the spring 181, abuts, however, for the time being against the underside of the bracket 193, i. e. is not yet completely disengaged. Only when the coupling pin 169 has reached, in the course of the rotation of the cam disc 99, the precise zero position, it enters an aperture 192 of the bracket 193, and thus is completely disengaged. The said aperture 192 now also, however, prevents at once a further turning (coasting) of the cam disc 99, and the latter is stopped in the accurately defined zero position. The shaft 124, together with all parts mounted thereon, thus is also stopped in the zero position, viz. by way of shaft 182 and pinions 183 and 175. In particular, the stud 176 is again located immediately above the coupling pin 169. The pawl

167, 190 now has passed by the trip arm 184 (shown in Fig. 9 by solid lines), and, although being held disengaged by the peripheral face of the collar secured to the coupling pin 169, is no longer engaged by the trip arm 184. A fresh start thus is readily possible. Since, in the example shown, the shaft 124 with the trip arm 184 is turning at one eighth of the speed of the cam disc 99, it may be readily seen that after each start the coupling is disengaged only after eight complete revolutions of the cam disc 99, in accordance with one revolution of the shaft 124.

To prevent, when coupling, the stud 176 from being caught in the aperture 192 of the bracket 193, due to being rotated immediately after starting, its diameter is made substantially smaller than that of the coupling pin 169. From the same reason, the bracket leg 193 is circularly slotted in the path of the stud 176, and the width of this slot is somewhat greater than the diameter of the stud 176.

The main advantage of the apparatus described is that the forces required for performing all necessary movements finally are derived from one and the same electric motor, preferably a small synchronous motor. Wherever sudden movements are released by spring forces, the said springs are retensed by the electric motor at another time of the entire functional course. Only the control of all these movements is effected by an electromagnet, the operating energy of which is supplied by the storage condenser, and thus finally by the control impulses arriving from the transmitter.

This feature permits of building receiver apparatus in accordance with my present invention, which comprise a minimum of switch elements and mechanical parts, and which, therefore, also may be fabricated very economically.

Practice shows that in electrical power distribution nets control voltages of sound-frequency for the operation of receivers are subject to great timely and local variations. The transmission output in the central station must, of course, be selected of such magnitude that the most unfavourably located receiver receive enough control energy yet, even at the most unfavourable moment. The result then is that favourably located receivers receive substantially more control voltage than necessary. As long as no switch element be overloaded thereby, this fact does no harm. The case may easily arise, however, that, e. g., the rectifier 85 or the storage condenser 86 are subjected to an excessive voltage and thus be damaged. The condenser 86 in any case may be readily built to accommodate any voltage, but when such consideration is applied to the rectifier, one obtains a great number of series-connected rectifier cells, which results in a low rectifier efficiency for receivers which receive only a small control voltage.

It therefore is more convenient to protect the rectifier 85 and the condenser 86 by some sort of a voltage cut-out or regulator. This may be done, e. g., by means of a discharge lamp 195 (Fig. 7), parallel-connected to the coil 82. When the voltage on the coil attains the ignition value, the lamp ignites, and the current passing therethrough increases the damping of the series resonance circuit so that a further substantial voltage rise on the coil 82 is prevented.

A second possibility for limiting the voltage consists in so dimensioning the iron core of coil 82 as to have the iron losses, upon passing beyond the desired voltage, increase rapidly by virtue of attaining a critical saturation, which also results in an additional damping of the series resonance circuit, and thus in a relatively slow further rise of the voltage.

Figures 12, 13:
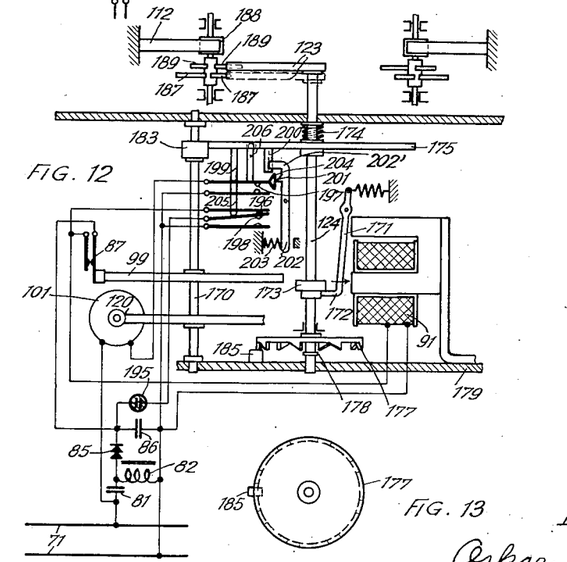
Figure 15:
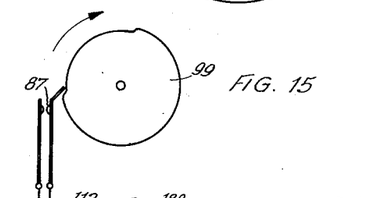

In Fig. 12 71 is a two-pole high-tension line, over which, aside from the regular 50-cycle line voltage, also the control impulses of, e. g., sound-frequency arrive at the individual subscriber's from an electrical central station. The condenser 81 forms a series resonance circuit together with the coil 82, which is tuned to the frequency of the control circuit. The rectifier 85 rectifies arriving control impulses, and transmits their energy onto the storage condenser 86. The discharge lamp 195 is on the circuit for actuating the switch devices. When, upon arrival of a first control impulse, i. e. a so-called starting impulse, the energy of the condenser 86 attains the value at which its voltage is equal to the ignition value of the discharge tube 195, the latter lights up and becomes conductive so that the condenser 86 can discharge through said lamp, contactor 196 and the electromagnet coil 91, down to the blow-out voltage of the lamp. The electromagnet pulls up the armature 171, and the lug 172 trips the shaft 124. The latter, together with wiper 123, toothed wheel 175, collar 173, crown wheel 177 (also see Fig. 13), and collar 178, is depressed by the spring 174, until collar 178 abuts against the mount 179. The armature 171, in spite of the discharge current having ceased, cannot return into its initial position for the time being, since its lug 172 now is abutting against the crown of the collar 173. The stud 199, secured to the toothed wheel 175 and consisting of insulating material, first makes contact 197, thus completing a line-voltage circuit through the synchronous motor 101 and starting the latter, and secondly makes contact 198, thus connecting the discharge lamp 195 in parallel with the storage condenser 86 so that the said lamp acts as voltage limiter for the further control impulses (see example according to Figs. 7–11). The synchronous motor 101 drives the cam disc 99 and the pinion 183, over a worm gear 120 and the shaft 170, at a speed of four R. P. M. for example. Contacts 197 and 198 for the time being are held made, the lug 201 of the pivotal lever 202, which consists of insulating material, being pushed by the spring 203 over the triangular end 204 of the top spring of contactor 197. The insulator stud 205 secured to the said latter spring keeps contact 198 made. The energy delivery of the condenser 86 is now controlled by contactor 87. The latter in its turn is made and broken by the cam disc 99, the shape and position of which at the start of the synchronous motor is detailed in Fig. 15. Immediately after the synchronous motor starts to turn, the cam disc 99 makes contact 87 during two thirds of a revolution (e. g. 10 seconds), in order to prevent a renewed charging of the condenser 86 by the remainder of the starting impulse and thus a misrepresentation of a further control impulse. After these two thirds of a revolution, contact 87 is broken, and the storage condenser 86 now is ready for receiving the following control impulse (first operating impulse). When such an impulse arrives, the condenser 86 is charged during the following third of a revolution of the cam disc 99, e. g. five seconds.

The contact 112 and the, e. g., six further contacts are made and broken by means of the wiper 123, spokes 187 and 189 and the switch cams 188, in exactly the same way and manner as described with reference to Figs. 7-11.

Figure 14:
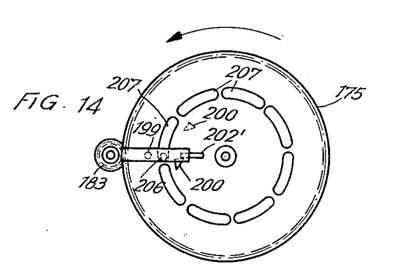

When the wiper 123 has passed by all of the seven contactors 112—118 and has regained its zero position, contacts 197 and 198 are broken, and contact 196 made again. The synchronous motor 101 thus is stopped, and the discharge lamp 195 again cuts into the circuit for operating the controller. This is done as follows: the toothed wheel 175, detailed in bottom view in Fig. 14, is provided with a wedge-shaped stud 200 and eight circularly spaced slots 207. The latter correspond to the seven switching positions and the starting position. The toothed wheel 175, as said before, rotates once per switching cycle and is shown in its position of start, and an insulator stud 206, secured to the upper spring of contactor 197, projects into the first slot 207 of the toothed wheel 175. Since, when starting the synchronous motor 101, the wheel 175 is depressed at each operating impulse, a slot 207 each must be provided for therein in front of each switch position, lest the stud 206 abut against the said wheel. After a rotation of the latter, the lug 201 is tripped free from the top spring of contactor 197 by the stud 200, since the slanting face of the wedge-shaped stud 200 displaces the bent portion 202' of lever 202, and thus also the lug 201, to the right. Contact 197, however, only is broken when stud 206 is permitted of entering the respective slot 207. This always is taking place somewhat later than the tripping of lug 201 so as to ensure that stud 200, when the motor 101 is stopping, is already again in front of the lug 201, which is absolutely necessary for the following correct start.

By connecting a discharge lamp in the circuit of the energy delivery, the continuous running of the electric motor may be dispensed with. The discharge lamp controls the charging condition of the storage condenser, until the starting impulse arrives.

Figure 16:
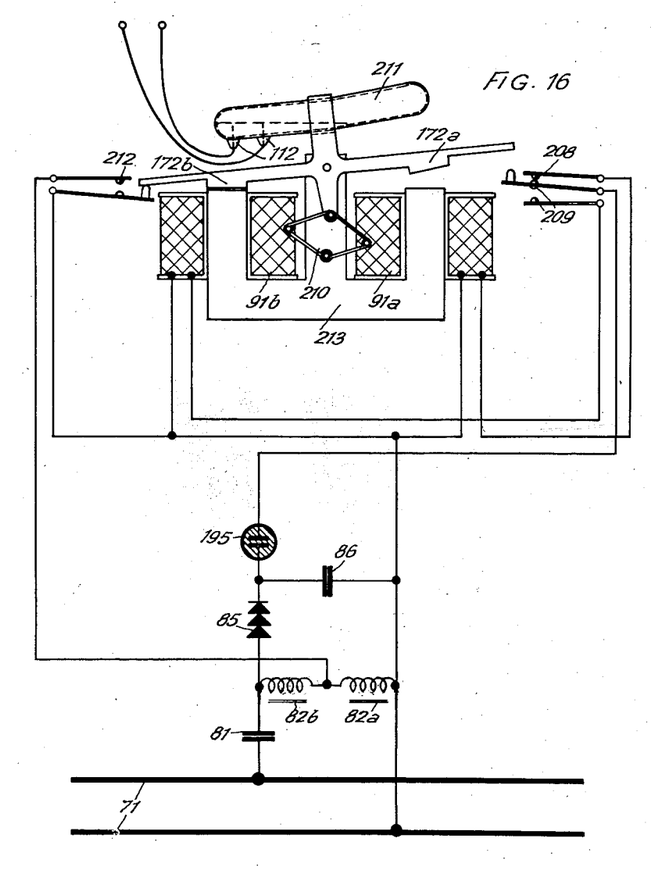
Fig. 16 is a schematical illustration of a last example.

In simpler cases of remote control, in which e. g. only a double command such as make and break is necessary, the electric motor is dispensed with altogether by using a discharge lamp. Fig. 16 shows such an embodiment. The two-pole power line 71 again is used for transmitting control impulses. An arriving control impulse, the frequency of which is tuned to the series resonance circuit 81, 82a and 82b, charges the storage condenser 86 through the rectifier 85 up to the ignition voltage of the discharge lamp 195.

The condenser 86 discharges through the latter, contactor 208, and the magnet coil 91a. The armature 172a is attracted and held in this position by the spring 210. The mercury of the interrupter 211 thus has broken contact 112 to be controlled. At the same time, the free end of the armature 172a has broken contact 208 and made contact 209. The free end of the armature 172b has made contact 212. The latter short-circuits the coil 82a, and thus adjusts the resonance circuit to another frequency. A control impulse tuned to the series resonance circuit 81 and 82b now is permitted of charging the condenser 86 up to the ignition voltage of the discharge lamp 195, and of exciting the magnet coil 91b through the latter and the contact 209. The interrupter 211 thus is rocked back into the position shown, and contact 112 made again. A plurality of mercury switches 211 may be disposed side by side, and actuated at the same time; it being immaterial in which position the switch contactors are disposed. The discharge tube remains in the discharge circuit of the storage condenser, and performs the control of the state of charging in all of the arriving control impulses. All movable parts intended to control the delivery of energy of the storage condenser thus may be dispensed with. For actuating the switches, an electromagnet 213 in place of a synchronous motor is sufficient, said electromagnet comprising two electrically separated magnet coils 91a and 91b, and two armatures 172a and 172b, which mechanically, however, form a single piece pivoted on the central leg of the magnet core.

Two frequencies, are necessary for the remote control of this receiver device, one thereof being used for obtaining the one switch position, and the other for obtaining the other switch position.

The receivers are insensitive with regard to control impulses of a frequency corresponding to the switch position already present, so that repeated switching commands only may influence receivers which from any reason have not yet been properly positioned.

My present invention permits of building a simple, positive and reliable remote-control receiver which consumes comparatively little current.

What I claim and desire to secure by Letters Patent is:

1. Receiving apparatus for remote control systems working with the method of intervals of impulses for electric switches to be remote controlled in electric power distribution networks by sound frequency or high frequency impulses sent over existing main lines, including: a single impulse responsive electromagnetic device, having an armature and an exciting coil, a rotatable and axially slidable switch operating shaft, means for causing said armature to normally engage said switch operating shaft against said engage-axial position, a spring tending to axially move said switch operating shaft against said engagement means in a second axial position, a single main fed synchronous motor, means operative upon reception of a starting impulse for causing said armature to release said switch operating shaft to be moved in axial direction by said spring and to operate said auxiliary contact for connecting said motor in circuit with the mains, and said motor begins to rotate said switch operating shaft with a speed corresponding to the speed of the impulse control device on the transmitting end, cam means and an abutment coacting with said cam means upon closure of said auxiliary contact to axially retract said switch operating shaft against spring action in the first axial position, into engagement with said armature, whereby said spring is loaded again by energy delivered from said motor, a switch operating device fixed on said switch operating shaft, a series of switches to be remote controlled, operatively associated with said switch operating device, whereby said switches are brought or left in one or the other of two possible operating positions by energy delivered from said same motor according to whether or not an actuating impulse is received during the time said switch operating device passes before a switch, in which case said actuating impulse energizes said electromagnetic device, thus releasing again said engagement and said spring moving again said switch-operating shaft in the second position, thereafter said switch operating shaft being retracted again in the first position by said cam means and said abutment, and finally said auxiliary contact being reopened by cam means controlled by said switch operating shaft after rotation of 360° of said switch operating shaft.

2. Receiving apparatus as claimed in claim 1, wherein the switch operating mechanism rotates in one or the other of two axially spaced planes, perpendicular to the main-shaft, each of said series of switches to be controlled having a rotatably mounted actuating member including a contact engaging cam and two groups of radial spokes, each group of spokes being disposed in one of said planes of rotation of said switch operating arm, the spokes of one group being angularly displaced relatively to the spokes of the other group, whereby said rotating switch operating arm, according to the control impulses received by said coil, engages the spokes of one or the other group of spokes to thereby move the contact operating cam into one or the other of two operating positions.

3. Receiving apparatus for a remote control system in which alternating current impulses of a constant frequency are transmitted from a control location to actuate remotely located switches, comprising an input circuit for receiving the impulses, said circuit being resonant at said frequency, and comprising a capacitor and an inductor connected in series, a storage capacitor and a rectifier connected in series across said inductor for charging the storage capacitor at the voltage developed across said inductor, a relay having an energizing winding, and switching means for connecting said storage capacitor to said winding so as to discharge through same.

4. Receiving apparatus as claimed in claim 3 in which a second switching means is provided for alternately disconnecting the storage capacitor from, and connecting the storage capacitor to, the winding at timed intervals and in which means actuated by energization of the relay disconnects the first mentioned switching means from the winding and places the second switching means into operation.

5. Receiving apparatus as claimed in claim 4 in which the first mentioned switching means is a discharge lamp, and the second switching means comprises a motor, a cam wheel rotated by the motor, and a switch operated by the cam wheel.

6. Receiving apparatus as claimed in claim 3 in which the switching means is a discharge lamp, in which means actuated by the energization of the relay disconnects the lamp from the winding, and connects the lamp across the storage capacitor, in which a second switching means is provided for alternately disconnecting the storage capacitor from, and connecting the storage capacitor to, the winding at timed intervals, and means actuated by the energization of the relay places the second switching means into operation.

7. Receiving apparatus as claimed in claim 6 in which the second switching means comprises a motor, a cam wheel rotated by the motor, and a switch operated by the cam.

8. Receiving apparatus as claimed in claim 3 in which the switching means includes a cam wheel rotated by a motor, and a switch closed and opened at spaced intervals by the cam wheel.

9. Receiving apparatus for a remote control system in which alternating current impulses of a constant frequency are transmitted from a control location to actuate remotely controlled switches, comprising an input circuit tuned to said frequency, a rectifier connected in said circuit for converting the alternating current impulses to direct current, a capacitor connected to said rectifier, a relay having an energizing winding, a discharge lamp connected to said capacitor and said winding for discharging the capacitor through the latter to energize said relay, a first means actuated when said relay is energized for disconnecting said lamp from said winding, an electric motor, a cam wheel driven by said motor, a switch actuated by said wheel for alternately connecting said capacitor to, and disconnecting said capacitor from, said winding, a second means actuated when said relay is energized for starting said motor, holding means for maintaining said first and second means actuated when said relay is deenergized, a switch arm rotated by said motor, a series of spaced, switch contacts associated with said arm and passed thereby during its rotation, means actuated when said relay is energized by the discharge of said capacitor when same is connected to said winding by said switch for causing said arm to touch an adjacent one of said contacts, and means actuated when said switch arm has rotated 360° for releasing said holding means whereby said first means reconnects said lamp to said winding and said second means stops said motor.

10. Receiving apparatus as claimed in claim 9 in which a third means actuated by the energization of the relay when its winding is energized by the discharge of the capacitor through the lamp, is provided for connecting the lamp across the capacitor, the holding means maintaining the third means actuated until the switch arm has rotated 360°.

OSKAR GROB.

REFERENCES CITED

The following references are of record in the file of this patent:

UNITED STATES PATENTS

| Number | Name | Date |
|---|---|---|
| 1,689,294 | Potts | Oct. 30, 1928 |
| 1,909,471 | Kelley | May 16, 1933 |
| 2,040,425 | Biach | May 12, 1936 |
| 2,086,913 | Kelley | July 13, 1937 |
| 2,222,218 | Wallace | Nov. 19, 1940 |
| 2,247,059 | Johnson | June 24, 1941 |
| 2,355,349 | Wheelock | Aug. 8, 1944 |
| 2,425,818 | Neiswinter | Aug. 19, 1947 |

FOREIGN PATENTS

| Number | Country | Date |
|---|---|---|
| 197,503 | Great Britain | May 17, 1923 |